US012607337B2

(12) United States Patent
Wang

(10) Patent No.: US 12,607,337 B2

(45) Date of Patent: Apr. 21, 2026

(54) LED LAMP WITH PLURALITY OF LIGHT EMISSION AREAS

(71) Applicant: Yuhua Wang, Beijing (CN)

(72) Inventor: Yuhua Wang, Beijing (CN)

( * ) Notice: Subject to any disclaimer, the term of this patent is extended or adjusted under 35 U.S.C. 154(b) by 0 days.

(21) Appl. No.: 18/996,294

(22) PCT Filed: Aug. 24, 2023

(86) PCT No.: PCT/CN2023/114691

§ 371 (c)(1),
(2) Date: Jan. 17, 2025

(87) PCT Pub. No.: WO2024/078151

PCT Pub. Date: Apr. 18, 2024

(65) Prior Publication Data

US 2025/0389415 A1 Dec. 25, 2025

(30) Foreign Application Priority Data

Oct. 15, 2022 (CN) ......................... 202222712702.5

(51) Int. Cl.

| | |
|---|---|
| ***F21S 8/04*** | (2006.01) |
| ***F21V 15/015*** | (2006.01) |
| ***F21V 23/04*** | (2006.01) |
| ***F21V 23/06*** | (2006.01) |
| ***H05B 45/20*** | (2020.01) |
| ***H05B 47/155*** | (2020.01) |

(Continued)

(52) U.S. Cl.

CPC .............. *F21V 23/04* (2013.01); *F21S 8/043* (2013.01); *F21V 15/015* (2013.01); *F21V 23/06* (2013.01); *H05B 45/20* (2020.01); *H05B 47/155* (2020.01); *H05B 47/17* (2020.01); *F21Y 2115/10* (2016.08)

(58) Field of Classification Search

CPC . F21S 6/008; F21S 8/046; F21S 8/043; F21V 15/015; F21V 21/02; F21V 21/088; F21V 21/025; F21V 23/04; F21Y 2107/50

See application file for complete search history.

(56) References Cited

U.S. PATENT DOCUMENTS

| | | | | |
|---|---|---|---|---|
| 6,132,061 A * | 10/2000 | Andrus ..................... | F21S 8/06 362/217.1 |
| 7,517,104 B1 * | 4/2009 | Leen ......................... | F21S 8/06 362/404 |

(Continued)

FOREIGN PATENT DOCUMENTS

| | | |
|---|---|---|
| CN | 104019412 | 9/2014 |
| CN | 203942681 U | 11/2014 |

(Continued)

OTHER PUBLICATIONS

International Search Report mailed in corresponding PCT/CN2023/114691 on Oct. 23, 2023 (6 pages).

*Primary Examiner* — Ismael Negron

(74) *Attorney, Agent, or Firm* — Wissing Miller LLP

(57) ABSTRACT

A lamp including an elongated casing; first and second end covers located at opposite ends of the casing; a main board located in the casing; a plurality of LEDs located on the main board to define a main lamp group disposed beneath the main board and a secondary lamp group disposed above the main board; and a pull-cord switch configured to control the operating states of the main and secondary lamp groups.

5 Claims, 3 Drawing Sheets

Cross-Sectional View Taken along Line A-A

(51) Int. Cl.
*H05B 47/17* (2020.01)
*F21Y 115/10* (2016.01)

(56) References Cited

U.S. PATENT DOCUMENTS

| | | | | |
|---|---|---|---|---|
| 9,057,493 | B2 * | 6/2015 | Simon | F21S 4/28 |
| 9,140,421 | B2 * | 9/2015 | Yeh | F21S 8/04 |
| 9,644,800 | B2 * | 5/2017 | Purdy | F21K 9/60 |
| 9,655,191 | B2 * | 5/2017 | Vissenberg | F21V 7/0016 |
| 9,752,754 | B2 * | 9/2017 | Trincia | F21V 5/048 |
| 10,125,946 | B2 * | 11/2018 | Meerbeek | F21S 8/06 |
| 10,352,510 | B2 * | 7/2019 | Van Winkle | F21V 23/04 |
| 10,969,067 | B2 * | 4/2021 | Van Bommel | F21S 4/24 |
| 2012/0212953 | A1 * | 8/2012 | Bloom | H05B 45/52<br>362/223 |
| 2017/0002990 | A1 * | 1/2017 | O'Brien | F21S 8/061 |
| 2023/0160548 | A1 * | 5/2023 | Hu | F21S 4/28<br>362/458 |

FOREIGN PATENT DOCUMENTS

| | | |
|---|---|---|
| CN | 204756515 | 11/2015 |
| CN | 108534016 | 9/2018 |
| CN | 213479870 | 6/2021 |
| CN | 218095633 | 12/2022 |
| JP | H06176615 | 6/1994 |

* cited by examiner

Cross-Sectional View Taken along Line A-A

LED LAMP WITH PLURALITY OF LIGHT EMISSION AREAS

CROSS-REFERENCE TO RELATED APPLICATIONS

The present international application claims priority from Chinese application No. 202222712702.5 for patent for utility model filed on Oct. 15, 2022, the entirety of which is incorporated herein by reference.

TECHNICAL FIELD

The present disclosure relates to the luminaire field, and in particular, to an LED lighting lamp for indoor use.

BACKGROUND

LEDs (Light Emitting Diodes), as a new type of lighting source, are becoming more and more popular due to their significant energy-saving and lifespan advantages. Currently, the traditional lighting lamps have been substantially replaced by LED lighting lamps. The LED lighting lamps of the existing technology usually have several luminous lamp sets inside, and the lighting modes of the lamps can be switched by frequently turning on or off the power switches. For example, the color temperatures of the color-temperature-switchable light bulbs in CN203942681U can be switched according to the number of times the external power is turned on during a predetermined period.

Generally, when the lamp is intended to illuminate a workbench in the center of a room while the external power switch is on the wall, the user needs to walk back and forth between the workbench and the wall if he needs to frequently switch the lighting mode of the lamp, which would be quite inconvenient.

In addition, although the user can switch the lighting mode of the lamp by providing a remote receipt and control module inside the lamp, i.e., using a remote controller to switch the lighting mode of the lamp instead of frequent walking back and forth, the cost would increase a lot.

SUMMARY

In order to solve the problems existing in the prior art, the present disclosure provides an LED lighting lamp, including: a strip-shaped lamp casing, a first end cover, a second end cover, and a main board. The first end cover and the second end cover are located at two ends of the strip-shaped lamp casing, respectively, and the main board is located in the strip-shaped lamp casing. The strip-shaped lamp casing has one main light-transmitting area below the main board and two secondary light-transmitting areas over the main board.

A main lamp group is disposed beneath the main board and a secondary lamp group is disposed above the main board. Light emitted from the main lamp group is transmitted through the main light-transmitting area, and light emitted from the secondary lamp group is transmitted through the two secondary light-transmitting areas.

The first end cover is further provided with a pull-cord switch for controlling operating states of the main lamp group and the secondary lamp group.

The lighting lamp further comprises a mounting snap having two gripping jaws, the strip-shaped lamp casing further has a mounting portion provided on an upper portion of a body of the strip-shaped lamp casing, and the mounting portion is provided with two transverse protrusions which cooperate with the gripping jaws to fix the LED lighting lamp in a use place.

The first end cover or the second end cover is further provided with a socket for supplying power to another LED lighting lamp, so as to connect a plurality of LED lighting lamps in parallel and supply power to the plurality of LED lighting lamps.

Two main board mounting grooves are provided on an inner wall of the strip-shaped lamp casing, arranged opposite to each other on the left and right and extend through the strip-shaped lamp casing along a length direction of the strip-shaped lamp casing.

The LED lighting lamp is switched among the following three lighting modes under the control of the pull-cord switch: only the main lamp group is turned on, only the secondary lamp group is turned on, and the main lamp group and the secondary lamp group are simultaneously turned on.

The main lamp group has a color temperature different from the secondary lamp group, such that light in a room has different cold and warm color tone combinations.

The advantageous technical effect of the present disclosure is that: by providing the pull-cord switch on the LED lighting lamp, when a user needs to frequently switch the lighting mode of the lamp or turn on or off the lamp, the operation can be completed just by pulling a pull cord of the pull-cord switch at the first end cover of the lamp, without walking back and forth between the wall and the lamp, which saves the user's time and energy.

10. Strip-shaped lamp casing;
11. Main light-transmitting area;
12. Secondary light-transmitting area;
13. Mounting portion;
14. Transverse protrusion;
15. Main board mounting groove;
21. First end cover;
22. Second end cover;
3. Main board;
31. Main lamp group;
32. Secondary lamp group;
4. Pull-cord switch;
41. Pull cord;
5. Mounting snap;
51. Gripping jaw.

DETAIL DESCRIPTION OF EMBODIMENTS

The embodiments of the LED lighting lamp of the present disclosure will now be described in detail with reference to the accompanying drawings.

Figure 1:
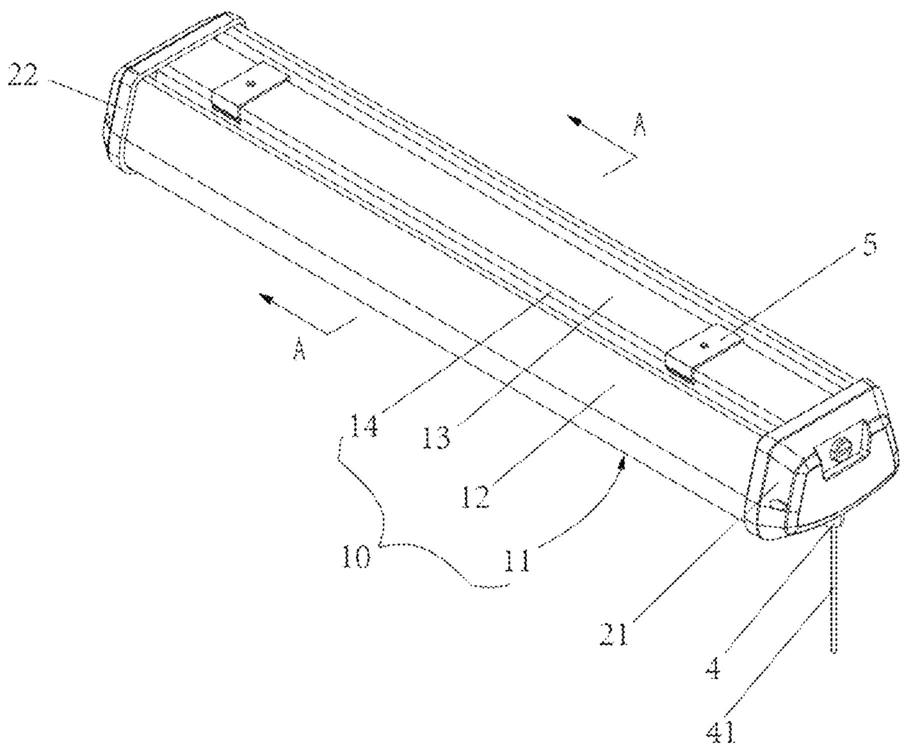
FIG. 1 is a schematic perspective view of an LED lighting lamp of the present disclosure.
Figure 2:
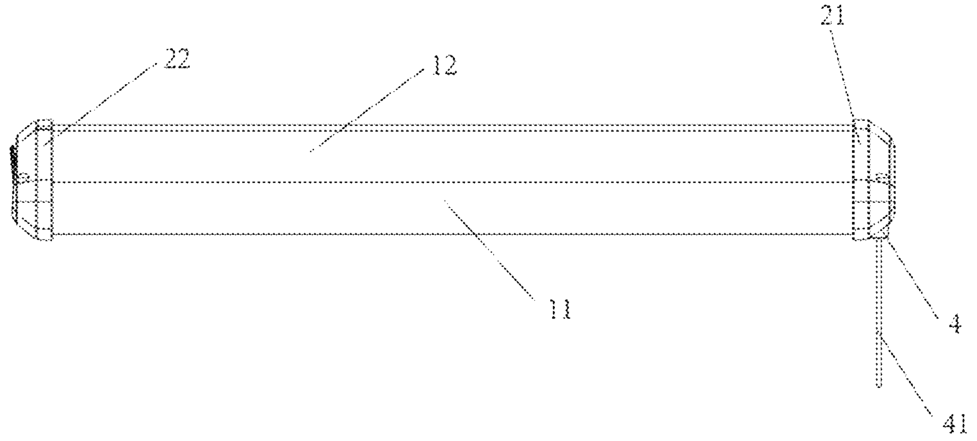
FIG. 2 is a right view of the LED lighting lamp of the present disclosure.
Figure 3:
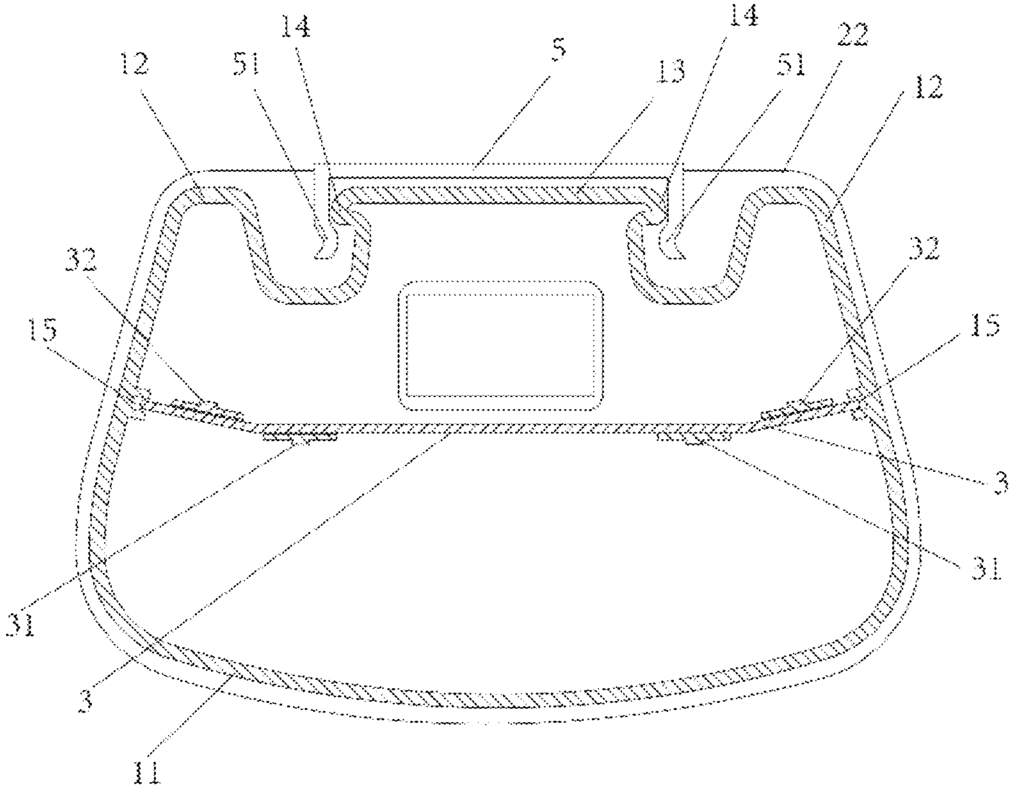
FIG. 3 is an enlarged cross-sectional view of the LED lighting lamp along line A-A in FIG. 1.

As shown in FIGS. 1-3, an LED lighting lamp includes a strip-shaped lamp casing 10 having a main light-transmitting area 11 and two secondary light-transmitting areas 12, and the main light-transmitting area 11 and two secondary light-transmitting areas 12 are made of a transparent or semi-transparent material such as plastic or glass. A main board mounting groove 15 is disposed at a boundary between the main light-transmitting area 11 and the secondary light-transmitting area 12 for mounting the main board 3. Two main board mounting grooves 15 are arranged opposite to each other on the left and right and extend through the strip-shaped lamp casing 10 along a length direction of the strip-shaped lamp casing 10. The strip-shaped lamp casing 10 further has a mounting portion 13 provided on an upper portion of a body of the strip-shaped lamp casing, and the mounting portion 13 is provided with two transverse protrusions 14 which cooperate with other fixing devices having a clamping function, so as to mount the LED lighting lamp in a use place such as a ceiling or roof.

The main light-transmitting area 11, the secondary light-transmitting areas 12, the mounting portion 13, the transverse protrusions 14, and the main board mounting grooves 15 together constitute the strip-shaped lamp casing 10 of the present disclosure. In order to achieve a better waterproof and dustproof effect, the main light-transmitting area 11, the secondary light-transmitting areas 12, the mounting portion 13, the transverse protrusions 14, and the main board mounting grooves 15 may be integrally formed rather than be spliced together from separate members.

The main board 3 is provided with a main lamp group 31 and a secondary lamp group 32, where the main lamp group 31 is disposed beneath the main board 3, and the secondary lamp group 32 is disposed above the main board 3. The main board 3 may be a printed circuit board, or an aluminum substrate or iron board having good heat dissipation effect, for example.

The main lamp group 31 and the secondary lamp group 32 are formed of a plurality of LED beads, which may be directly mounted on the main board, or the plurality of LED beads may be manufactured into a hard or soft lamp strip at first, then the hard or soft lamp strip is mounted onto the main board 3. Light emitted from the main lamp group 31 is transmitted through the main light-transmitting area 11 to illuminate an area under the LED lighting lamp, and light emitted from the secondary lamp group 32 is transmitted through the two secondary light-transmitting areas 12 to illuminate an area above the lamp.

The LED lighting lamp of the present disclosure further includes a first end cover 21 at one end of the strip-shaped lamp casing 10 and a second end cover 22 at the other end of the strip-shaped lamp casing 10. The first end cover 21 is further provided a pull-cord switch 4 for controlling the operating states of the main lamp group 31 and the secondary lamp group 32. By pulling the pull cord 41 of the pull-cord switch 4, after the power of the lighting lamp is turned off, if the power is turned on again in a certain period of time, for example, in 1 second, 2 seconds, or 3 seconds, the lighting mode of the main lamp group 31 and the secondary lamp group 32 is changed, and if the power is turned on after a certain period of time expires, the lighting mode before the power is turned off will be maintained. The lighting mode is switched among the following three modes: only the main lamp group is turned on, only the secondary lamp group is turned on, and the main lamp group and the secondary lamp group are simultaneously turned on. Since the method of switching the lighting mode of a lamp by returning on the power of the lamp in a time interval after the power of the lamp is turned off belongs to the existing technology, detailed description of such method is omitted here.

The LED lighting lamp of the present disclosure further includes a mounting snap 5, which has two gripping jaws 51. The gripping jaws 51 are elastic and can be opened by means of elastic deformation, so as to cooperate with two transverse protrusions provided on the mounting portion 13, thereby fixing the LED lighting lamp in a use place such as a ceiling or roof.

When a plurality of LED lighting lamps need to be mounted, a socket for supplying power to another LED lighting lamp is further provided on the first end cover 21 or the second end cover 22 (not shown in the drawing), so as to connect a plurality of LED lighting lamps in parallel and supply power to the plurality of LED lighting lamps.

In the LED lighting lamp of the present disclosure, the main lamp group 31 has a color temperature different from the secondary lamp group 32, for example, the main lamp group 31 adopts LED lamps emitting light of a cold tone while the secondary lamp group 32 adopts LED lamps emitting light of a warm tone. When the user needs to focus on his work, the LED lighting lamp is switched to a mode where only the main lamp group 31 is turned on by pulling the pull-cord switch 4, since a cold color tone would make a person concentrate; when the user needs rest, the LED lighting lamp is switched to a mode where only the secondary lamp group 32 is turned on, since a warm color tone would make a person relax.

The preferable embodiments of the present disclosure described above are just for illustrating the present disclosure only. The preferable embodiments do not elaborate on all details, nor do they limit the present disclosure to specific implementations only. Obviously, various modifications and variations can be made according to the content of the present disclosure. The embodiments are chosen and described in detail in order to better explain the principles and the practical applications of the present disclosure, to thereby enable those skilled in the art to understand and utilize the present disclosure. The present disclosure is to be limited only by the claims and their full scope and equivalents.

What is claimed is:

1. An LED lighting lamp, comprising:

a strip-shaped lamp casing, a first end cover, a second end cover, and a main board, wherein the first end cover and the second end cover are located at two ends of the strip-shaped lamp casing, respectively, the main board is located in the strip-shaped lamp casing, the strip-shaped lamp casing has a main light-transmitting area below the main board and two secondary light-transmitting areas over the main board;

wherein a main lamp group is disposed beneath the main board, a secondary lamp group is disposed above the main board, light emitted from the main lamp group is transmitted through the main light-transmitting area, and light emitted from the secondary lamp group is transmitted through the two secondary light-transmitting areas;

wherein the first end cover is further provided with a pull-cord switch for controlling operating states of the main lamp group and the secondary lamp group; and wherein the LED lighting lamp further comprises a mounting snap having two gripping jaws, the strip-shaped lamp casing further has a mounting portion provided on an upper portion of a body of the strip-shaped lamp casing, and the mounting portion is provided with two transverse protrusions which cooperate with the gripping jaws to fix the LED lighting lamp in a use place.

2. The LED lighting lamp of claim 1, wherein the first end cover or the second end cover is further provided with a socket for supplying power to another LED lighting lamp, so as to connect a plurality of LED lighting lamps in parallel and supply power to the plurality of LED lighting lamps.

3. The LED lighting lamp of claim 1, wherein two main board mounting grooves are provided on an inner wall of the strip-shaped lamp casing, arranged opposite to each other on the left and right and extend through the strip-shaped lamp casing along a length direction of the strip-shaped lamp casing.

4. The LED lighting lamp of claim 1, wherein the LED lighting lamp is switched among the following three lighting modes under the control of the pull-cord switch: only the main lamp group is turned on, only the secondary lamp group is turned on, and the main lamp group and the secondary lamp group are simultaneously turned on.

5. The LED lighting lamp of claim 1, wherein the main lamp group has a color temperature different from the secondary lamp group, such that light in a room has different cold and warm color tone combinations.

* * * * *